G. M. CLARK.
Vegetable-Cutter.

No. 210,098. Patented Nov. 19, 1878.

Witnesses:
Rob't J. Gaylord
Lewis Sperry

Inventor:
Geo. M. Clark,
By W. E. Simonds
Att'y.

UNITED STATES PATENT OFFICE.

GEORGE M. CLARK, OF HIGGANUM, CONNECTICUT.

IMPROVEMENT IN VEGETABLE-CUTTERS.

Specification forming part of Letters Patent No. 210,098, dated November 19, 1878; application filed December 7, 1877.

*To all whom it may concern:*

Be it known that I, GEORGE M. CLARK, of Higganum, in the county of Middlesex and State of Connecticut, have invented certain new and useful Improvements pertaining to a Root and Vegetable Cutter, of which the following is a specification, reference being had to the accompanying drawings, where—

Figure 3:
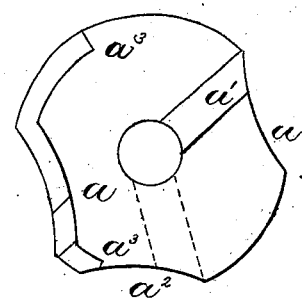
Figure 4:
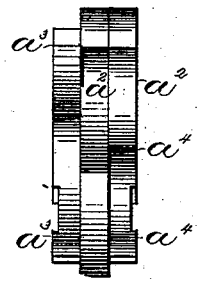
Figure 5:
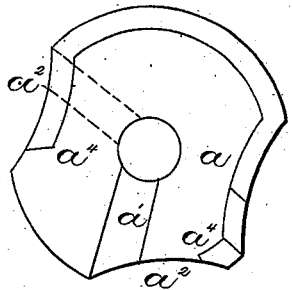
Figure 2:
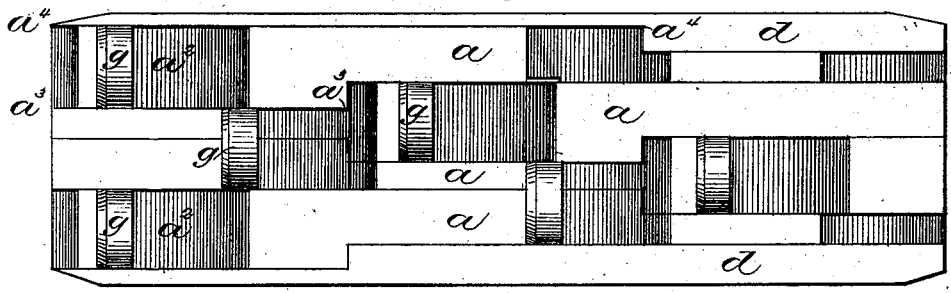
Figure 1:
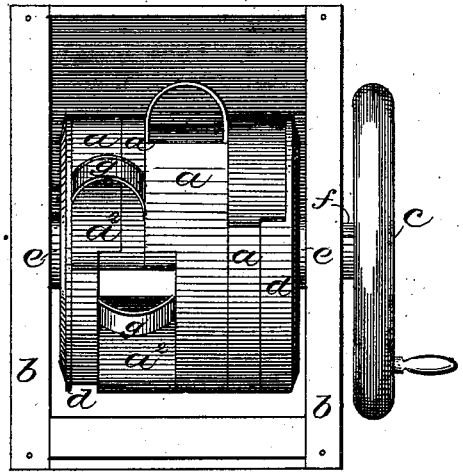
Figure 6:

Figure 1 is a top view. Fig. 2 is a view of the entire surface of the cutter-roll developed on a plane surface. Fig. 3 is a view of one side of one of the sections of the cutter-roll. Fig. 4 is an edge view of the same from the side or point A. Fig. 5 is a view of the opposite side of the same section. Fig. 6 is a detail view of one of the looped cutting-knives.

The letters $a$ each denote a section of the cutter-roll. All are alike, and are, by preference, of cast-iron. They are all hung on a central shaft, hung in proper bearings on the frame of the hopper $b$, and provided at one end with the crank-wheel $c$. They are kept together by the side plates, $d$, against which are screwed the nuts $e\ e$, borne on the central rotary shaft, $f$.

The knives $g$ are looped or doubled, as shown in Fig. 6, so as to make a curved or rounded cut from the potato or other vegetable.

So far as the cutter-sections are concerned, they will hold straight knives as well as looped ones; but the looped knives are an improvement over straight knives, in that they make a cut in the nature of a bite.

The knives are held in place by being grasped between the roll cutter-sections—an arrangement which permits the easy placement and displacement of the knives.

The roll cutter-sections are provided on the sides with knife-sockets $a^1$, into which the bodies of the knives fit and lie.

The knives are so arranged that they lap one upon the other—that is, supposing one knife to have cut a piece from the vegetable, another knife coming behind will divide the piece so just cut from the vegetable.

The roll cutter-sections are provided with fall-backs or cut-aways $a^2$, even with or back of the edges of the knives, to allow the cut pieces to readily clear.

While roll cutter-sections of different shape from those shown in the drawings will answer the purpose of holding knives, sections of the shape shown are peculiarly adapted to the purpose. The shape shown includes the rise or boss on one side from $a^3$ to $a^3$, and on the other side from $a^4$ to $a^4$.

By the word "roll-sections," as used in the following claims, I do not mean to include any and all sections of a roll irrespective of their shape and function; but the word, as used by me, means wheel-like parts fitting together side by side upon a central shaft, to make, together, a roll the thickness of which, in the direction of the shaft or axis, is the sum of the thickness of the various wheel-like parts; and in giving effect to the following claims I limit myself to this definition of the word "roll-sections."

When the roll-sections are thus made they serve the important purpose of securing the knives in place simply by pressing the knives between the sections.

I claim as my improvement—

1. The looped knives $g$, combined with the roll-sections $a$, substantially as shown and described.

2. The looped knives $g$ and the roll-sections $a$, provided with the knife-sockets $a^1$ and cut-aways $a^2$, combined and arranged substantially as shown and described.

GEORGE M. CLARK.

Witnesses:
  ANDREW J. TRACY,
  WALTER N. GAY.